3,034,865
SULFUR PRODUCTION
Peter Urban, Northbrook, Ill., assignor to Universal Oil Products Company, Des Plaines, Ill., a corporation of Delaware
No Drawing. Filed Nov. 25, 1960, Ser. No. 71,461
9 Claims. (Cl. 23—225)

This invention relates to a process for producing sulfur from hydrogen sulfide and in particular relates to a process for oxidizing hydrogen sulfide in a specific solution and employing a specific catalyst.

Hydrogen sulfide is a common material available from many sources. It is very frequently useful only when converted to some other material such as sulfur or sulfuric acid. However, recovering hydrogen sulfide for the purpose of converting it is frequently difficult. For example, in refining petroleum, hydrogen sulfide is produced in large quantities as an undesirable contaminant mixed with larger quantities of other material. Frequently the hydrogen sulfide which is produced is passed to the atmosphere as a waste material since the cost of recovering it is not warranted by the value of the product recovered. In populous areas disposing of hydrogen sulfide to the atmosphere represents a nuisance and in these cases expensive recovery methods must be employed even though they are not economically justified.

In some cases hydrogen sulfide must be removed from various process streams in order to prevent the contamination of those streams. For example, the presence of sulfur compounds in gasoline is detrimental since they have a suppressing effect on octane number and cause the gasoline to be corrosive, unstable and sour. In some process streams hydrogen sulfide must be removed to prevent its detrimental effect upon subsequently employed catalysts. For example, in catalytically reforming a gasoline fraction, a net hydrogen production is realized which is at least partially recirculated to the reforming zone to saturate olefinic material and to prevent carbonization of the catalyst. It is desirable for the recycled hydrogen-containing streams to contain as little hydrogen sulfide as possible, thereby preventing its undesirable effect upon the catalyst. It is, therefore, often necessary and always desirable to remove hydrogen sulfide from this and similar streams. The present invention provides a means for recovering the valuable sulfur from hydrogen sulfide and furthermore provides an economical and efficient means for removing hydrogen sulfide from other material even though it is present in relatively low concentrations.

In one embodiment the present invention relates to a process for converting hydrogen sulfide to elemental sulfur which comprises forming a reaction mixture of hydrogen sulfide and a basic nitrogen-compound solution and reacting said mixture with oxygen in the presence of a metal phthalocyanine catalyst.

An essential feature of the present invention is that the solvent used in forming the reaction mixture must be a nitrogen compound. When using an ammoniacal solvent to form the reaction mixture, the sulfide will be in the form of ammonium sulfide or an equilibrium mixture of ammonium sulfide and hydrogen sulfide. Applicant has found that using the nitrogen compound in forming the reaction mixture produces sulfur upon oxidation in accordance with the present invention. In contrast, applicant has not been able to recover free sulfur when using other solvents such as aqueous solutions of sodium hydroxide or potassium hydroxide in forming the reaction mixture.

Another essential feature of the present invention is the use of a metal phthalocyanine catalyst in effecting the conversion of the hydrogen sulfide or ammonium sulfide to free sulfur. As will be illustrated by the examples appended to the present specifications, the metal phthalocyanine catalyst is especially effective in accomplishing the desired oxidation to form free sulfur. Another important advantage to the metal phthalocyanine catalyst is that this catalyst is stable under the conditions employed in the oxidation step. This is in contrast to the use of other catalysts which either are not effective in producing free sulfur or which will decompose during the reaction and thus will have a very short active and useful life.

As hereinbefore set forth, the catalyst for use in the present invention is a metal phthalocyanine catalyst. Particularly preferred metal phthalocyanines include cobalt phthalocyanine and vanadium phthalocyanine. Other metal phthalocyanines include iron phthalocyanine, nickel phthalocyanine, copper phthalocyanine, molybdenum phthalocyanine, manganese phthalocyanine, tungsten phthalocyanine, chromium phthalocyanine, etc. In most cases a derivative of the metal phthalocyanine is preferred. A particularly preferred derivative is the sulfonated derivative. Thus, an especially preferred phthalocyanine catalyst is cobalt phthalocyanine sulfonate. Such a catalyst is available commercially and comprises cobalt phthalocyanine disulfonate and also contains cobalt phthalocyanine monosulfonate. Another preferred catalyst comprises cobalt phthalocyanine trisulfonate. Still another preferred catalyst comprises vanadium phthalocyanine sulfonate. These compounds may be obtained from any suitable source or may be prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis. It is understood that the different catalysts are not necessarily equivalent.

In one embodiment of the invention the catalyst is utilized as a solution in the nitrogen-compound solvent. In another embodiment the catalyst is composited with an adsorptive support such as activated charcoal, silica, alumina, zirconia, kieselguhr, bauxite, diatomaceous earth or other natural or synthetic highly porous relatively inert inorganic supports. Any suitable means of compositing the catalyst with the support may be used including impregnating the support by immersing it in a solution of the catalyst and subsequently drying it. It is, of course, essential that the drying or other activating means employed be under conditions that do not destroy the catalytic nature of the composite or the catalyst itself.

As hereinbefore set forth, the solutions employed must be ammoniacal or amine solutions and may be aqueous, alcoholic, or other suitable organic solutions. The amine solutions may comprise primary, secondary or tertiary amines including, for example, methyl amine, ethyl amine, propyl amine, butyl amine, etc., dimethyl amine, diethyl amine, dipropyl amine, dibutyl amine, etc., trimethyl amine, triethyl amine, tripropyl amine, etc., alkanolamines including for example, ethanolamine, propanolamine, butanolamine, diethanolamine, etc., heterocyclic amines including, for example, pyridine, pyrrolidine, alkylpyridines, alkylpyrrolidines, piperidine, etc., their derivatives and the like. When employing the specific catalyst and specific solutions of this invention, elemental sulfur is recovered from the process with very small production of undesirable sulfur compounds such as thiosulfates, sulfates, sulfites, thiophenes, mercaptans, etc., and the sulfur is recovered as a solid phase which is readily separated from the solution.

It is also within the scope of this invention to employ secondary solvents other than those mentioned in the examples appended hereto. The use of a secondary solvent appears to effect a close contact of the catalyst and the reactants which enhances the desired oxidation reaction. Any secondary solvent which mutually dissolves the $H_2S$ and oxygen reactants as well as the catalyst may be used. Other secondary solvents may include ketones, aldehydes, weak acids, glycols, etc.

For maximuum recovery of sulfur, it is preferred that the reaction mixture contain the sulfide in a high concentration. Accordingly, in one embodiment, it is preferred that the sulfide is present in the reaction mixture in a concentration of greater than 2% and still more preferably greater than 5% and may range up to the maximum concentration obtainable in the specific solvent employed. Generally, when the sulfide is present in the reaction mixture in a very low concentration as, for example, in a concentration below about 0.1% by weight, it usually is uneconomical and impractical to convert the same into sulfur. However, it is understood that, when desired, such mixtures may be treated in accordance with the present invention.

The oxidation of the sulfide to free sulfur generally is effected with a reaction mixture having a pH above neutral and preferably within the range of from about 8 to about 14 and still more particularly within the range of from about 10 to about 11.5. A reaction mixture having a pH within this range is readily obtained by absorbing hydrogen sulfide in an aqueous ammonia solution, and the resultant reaction mixture is particularly suitable for further conversion in the manner herein set forth.

The process of the present invention may be effected in any suitable apparatus which may be specially adapted for the particular hydrogen sulfide stream to be treated. For example, when a stream having a high hydrogen sulfide concentration is employed, the process may be effected by absorbing both the hydrogen sulfide and oxygen in a pool of solvent containing the catalyst. When the source of hydrogen sulfide is a process stream which is to be purified, the solvent may be used in a separate zone as an absorbing medium to remove hydrogen sulfide from the main stream thereby purifying that stream. The hydrogen sulfide-rich solvent then is passed to a separate reaction zone wherein it is contacted with oxygen in the presence of the catalyst of this invention, thereby producing sulfur and regenerating the solvent for further use in purifying the process stream.

The process may be effected using air or using oxygen by itself or mixed with other gases and it may be effected by absorbing the reactants in a pool of solvent or in a slurry or suspensoid operation wherein the reactants pass concurrently or countercurrently with the moving solvent and catalyst. In another embodiment the composite of catalyst and adsorptive support may be disposed as a fixed bed in a reaction zone and the oxygen and the solution of sulfide are supplied thereto either cocurrently or concurrently. In still another embodiment, a fixed bed of a basic resin is disposed in a reaction zone and the sulfide, oxygen and catalyst are supplied thereto. The concentration of air or oxygen preferably is approximately that stoichiometrically required to effect the desired oxidation reaction, although lower or higher concentrations may be used in some cases. However, a large excess should not be used as this may tend to result in oxidation of the sulfide beyond the desired free sulfur stage. The reaction may be effected in a counter current, multistage manner when complete recovery and conversion are desired and, when so effected, any desired degree of recovery and conversion may be obtained by employing a sufficient number of stages.

The process is effected at any suitable temperature which may range from ambient to 400° F. or more, preferably being within the range of from 80° to 200° F. Superatmospheric pressures may be used and will be beneficial in allowing higher operating temperatures while still maintaining liquid phase solvents and increasing the solubility of the vapor phase reactants in the solution. Superatmospheric pressures may range from 5 to 1000 or more p.s.i.g. and preferably from 10 to 100 p.s.i.g.

Following are several examples which illustrate the operability and utility of the present invention and are intended to be illustrative rather than limiting on its broad scope.

EXAMPLE I

A mixture of hydrogen sulfide gas and air was bubbled through an aqueous ammonia solution at 77° F. to form a solution containing 6.85% by weight of sulfide. The solution was allowed to stand for 45 minutes. Subsequently, the solution was evaporated to dryness and only 4.7% of the original sulfur was recovered in the form of elemental sulfur.

EXAMPLE II

A second mixture of $H_2S$ and air was bubbled through an aqueous ammonia solution at 77° F. to form a solution containing 8% by weight of sulfide. A catalyst manufactured by impregnating charcoal with iron phthalocyanine until the charcoal contained 1% of iron phthalocyanine by weight was added previously to the reaction zone. The operating conditions were identical to those of Example I. Upon evaporation, the solution yielded 17.5% of the original sulfur in the form of elemental sulfur.

EXAMPLE III

The $H_2S$-air mixture of Examples I and II was bubbled through methanol-ammonia solution at 77° F. which contained a catalyst manufactured by impregnating charcoal with 0.5% iron phthalocyanine and, upon evaporation of the solution, it was found that 31% of the original sulfur was converted to elemental sulfur.

EXAMPLE IV

The $H_2S$ mixture of the previous examples is bubbled through an aqueous ammonia solution containing a catalyst comprising cobalt phthalocyanine disulfonate and maintained at a temperature of 125° F. The reaction mixture is allowed to stand to allow precipitation of the free sulfur and then is filtered to separate the solid sulfur from the solution of catalyst and aqueous ammonia.

EXAMPLE V

The runs reported in the previous examples were made with the only mixing being obtained by the bubbling of the gas through the solution. The present runs were made using a reactor containing a stirring paddle in order to obtain more efficient contact between the reactants and catalyst. The paddle was operated at 2500–3000 r.p.m. The reaction mixture was formed by absorbing hydrogen sulfide in aqueous ammonia solutions, the specific concentrations of hydrogen sulfide and ammonia being set forth in the following table. The reaction mixtures were at a pH of 11.5 and were reacted with air at a temperature of 86° F. in the stirred reactor containing 200 parts per million of cobalt phthalocyanine trisulfonate.

The results of a number of runs made in the above manner are reported in the following table. In run No. 1, the catalyst was not used, the run being continued for 21 minutes. In the other runs reported in the following table the cobalt phthalocyanine trisulfonate catalyst was used and the runs continued for 9 to 15 minutes.

Table I

| Run No. | Catalyst | Moles of Sulfide | Ammonia Concentration, percent | Sulfide, Wt. percent | Elemental Sulphur, Mole percent |
|---|---|---|---|---|---|
| 1 | No | 0.0115 | 1 | 0.36 | None detected. |
| 2 | Yes | 0.0055 | 1 | 0.18 | 71.5 |
| 3 | Yes | 0.0212 | 3.5 | 0.68 | 71. |
| 4 | Yes | 0.0636 | 4.2 | 2.48 | 72. |
| 5 | Yes | 0.127 | [1] 8.4 | 5.1 | 80. |
| 6 | Yes | 0.314 | 7.5 | 9.1 | 88. |

[1] In this run the volume of solution was 75 mls. In all other runs the volume of solution was 100 mls. each.

From the data in the above table it will be seen that no free sulfur was detected in run No. 1 which was effected in the absence of the catalyst. In contrast, considerable conversion to free sulfur was effected in all of the runs effected in the presence of the catalyst.

From the data in the above table it also will be noted that a higher mole percent of free sulfur was obtained in the runs using higher concentrations of sulfide in the reaction mixture. As hereinbefore set forth, the use of reaction mixtures having higher concentrations of sulfide is of advantage in producing higher yields of elemental sulfur.

EXAMPLE VI

As hereinbefore set forth, it is essential that the solvent is a nitrogen-containing compound. In runs similar to those described in the previous examples but utilizing sodium hydroxide solution instead of an aqueous ammonium solution, the predominant reaction is the conversion of the sulfide to sodium thiosulfate, with no free sulfur being recovered.

EXAMPLE VII

In runs similar to those described in Example VI but using potassium hydroxide solution, instead of sodium hydroxide solution, conversion of the sulfide to potassium thiosulfate is obtained, with no free sulfur being recovered.

I claim as my invention:

1. A process for converting hydrogen sulfide to free sulfur which comprises reacting hydrogen sulfide with oxygen in a basic nitrogen-compound solution in the presence of a metal phthalocyanine catalyst.

2. A process for converting hydrogen sulfide to sulfur which comprises absorbing hydrogen sulfide in a basic nitrogen-compound solution and reacting said solution with oxygen in the presence of a metal phthalocyanine catalyst.

3. A process for converting hydrogen sulfide to sulfur which comprises absorbing hydrogen sulfide in an ammoniacal solution and reacting the ammoniacal solution with oxygen in the presence of a metal phthalocyanine sulfonate catalyst.

4. The process of claim 3 wherein said catalyst is a cobalt phthalocyanine sulfonate.

5. The process of claim 3 wherein said catalyst is a vanadium phthalocyanine sulfonate.

6. The process of claim 3 wherein said catalyst is a cobalt phthalocyanine carboxylate.

7. The process of claim 3 wherein said catalyst is a vanadium phthalocyanine carboxylate.

8. The process of claim 3 wherein said catalyst is a composite of metal phthalocyanine and a solid carrier.

9. The process of claim 8 wherein said catalyst is a composite of a cobalt phthalocyanine sulfonate and a carbon carrier.

References Cited in the file of this patent

UNITED STATES PATENTS 2,853,432    Gleim et al. _____ Sept. 23, 1958